United States Patent [19]

Dalibor

[11] 4,145,513

[45] Mar. 20, 1979

[54] PROCESS FOR THE MANUFACTURE OF SOLUBLE COPOLYMERS WHICH CONTAIN HYDROXYL GROUPS AND CAN BE CROSSLINKED WITH ORGANIC POLYISOCYANATES

[75] Inventor: Horst Dalibor, Norderstedt, Fed. Rep. of Germany

[73] Assignee: Hoechst Aktiengesellschaft, Fed. Rep. of Germany

[21] Appl. No.: 798,997

[22] Filed: May 20, 1977

[30] Foreign Application Priority Data

Jun. 16, 1976 [DE] Fed. Rep. of Germany ....... 2626900

[51] Int. Cl.$^2$ ............................................ C08G 18/62
[52] U.S. Cl. ....................................... 528/75; 526/273
[58] Field of Search ................ 260/77.5 CR; 428/425; 528/75

[56] References Cited

U.S. PATENT DOCUMENTS

| | | | |
|---|---|---|---|
| 3,694,415 | 9/1972 | Honda et al. | 260/77.5 CR |
| 3,701,679 | 10/1972 | Johnson et al. | 260/77.5 CR |
| 3,998,768 | 12/1976 | Pettit | 260/77.5 CR |

*Primary Examiner*—M. J. Welsh
*Attorney, Agent, or Firm*—Gordon W. Hueschen

[57] ABSTRACT

The present invention relates to a process for the manufacture of soluble copolymers, which contain hydroxyl groups, can be crosslinked with organic polyisocyanates and are based on mixtures of styrene, methyl methacrylate, hydroxyethyl methacrylate, acrylic acid and glycidyl esters of α-alkylalkanemonocarboxylic acids and/or α,α-dialkylalkanemonocarboxylic acids, by heating in inert organic solvents in the presence of polymerisation initiators and optionally chain stoppers, simultaneous esterification and polymerization taking place.

13 Claims, No Drawings

PROCESS FOR THE MANUFACTURE OF SOLUBLE COPOLYMERS WHICH CONTAIN HYDROXYL GROUPS AND CAN BE CROSSLINKED WITH ORGANIC POLYISOCYANATES

BACKGROUND OF THE INVENTION

(1) Field of the Invention

The object of the present invention is to provide a process for the manufacture of soluble organic copolymers, which give non-tacky, water-resistant and elastic films on very diverse substrates or are suitable as binders for pigments, paints and non-wovens, and for the use of these copolymers as a binder component, the sheet-like structures, which can be manufactured from these polymers, having, however, properties which are considerably improved in various respects. In this connection, a lacquer, which contains the new soluble organic copolymers in combination with organic polyisocyanates and is applied to a metallic substrate, should cure, after drying in air for three to four days at temperatures of about 20° C., in such a way that the film no longer swells under the action of water and also cannot be removed mechanically by scraping, even if the film is briefly exposed to water at temperatures of 50°–70° C.

Furthermore, the binders should exhibit a good pigment-binding capacity and should also possess good resistance to weathering. These binders are employed mainly as automotive lacquers for final lacquering or as car touch-up lacquers.

The object of the invention has been achieved by copolymerising a narrow selected range of amounts of the monomers using special manufacturing methods.

(2) Prior Art

Numerous proposals have been disclosed for the manufacture of lacquers which are resistant to solvents and alkali by the reaction of polyisocyanates with copolymers containing hydroxyl groups and for the processing of these lacquers to coatings. In German Auslegeschrift 1,247,006 a process is described for the manufacture, by the polyisocyanate polyaddition process, of alkali-resistant sheet-like structures, which are obtained from copolymers containing hydroxyl groups and polyisocyanates, but these sheet-like structures are not adequately water-resistant after a reaction time of three to four days at 20° C. These coatings obtained by this known process are therefore not suitable as lacquers for exterior lacquer coatings which are resistant to weathering, since blisters form after an extremely short time and the adhesion of the lacquer to the various metal substrates decreases and, as a result, the lacquer lifts off from the substrate.

It is also known that polyhydroxy compounds of polyols and polyisocyanates can be cured in order to obtain cross-linked lacquer coatings which have good resistance properties. These combinations also have too low a resistance to water and the resistance to weathering of the cured lacquer layers is relatively low.

In French Patent Specification 1,556,309 a coating agent is described which contains solvents and, as film-forming constituents, A. a copolymer consisting of (1) 2–50 parts by weight of an addition product, in the ratio of 1:1, of a carboxyl group of an α,β-ethylenically unsaturated acid and an epoxide group of a glycidyl ester of an aliphatic carboxylic acid which has tertiary C atoms and in which the aliphatic tertiary group contains 4–26 C. atoms, and (2) 98–50 parts by weight of unsaturated copolymerisable monomers, the total amount of (1) and (2) adding up to 100 parts by weight, and B. at least one polyisocyanate which contains at least 2 isocyanate groups in the molecule, the amount of polyisocyanate contained in the coating agent being, relative to the copolymer, 0.02–5 equivalents, based on the hydroxyl groups of the copolymer.

As the examples in Table 1 on page 5 of this French Patent Specification show, the copolymers described in this specification have a hydroxyl group content of 0.8 to 3.18%, based on the copolymer.

The known coating agents do indeed give films which have a hard, solvent-resistant and water-resistant surface. However, a decisive defect is the inadequate gloss, the extensive dulling after weathering and a very short processing time for the two-component lacquers due to too rapid gelling.

The solution of the copolymer itself gives very high viscosities, so that lacquers are obtained which have a very high solvent content and only a low solids content.

In French Pat. Specification No. 1,390,572 a process for the manufacture of copolymers is described in which an α,β-unsaturated carboxylic acid, or one of its derivatives, is copolymerised, in a solvent, with one or more other vinyl monomers in the presence of a catalyst and, at the same time or subsequently, the reaction product is reacted with a glycidyl ester of the formula:

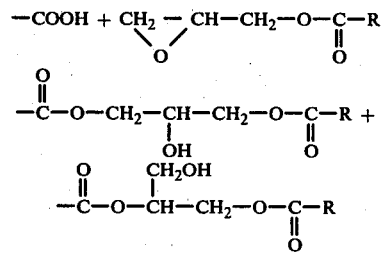

in which R is an aliphatic or aromatic radical which can also be substituted and which either is saturated or contains one or more ethylenically unsaturated bonds.

As the examples of this French Pat. Specification No. 1,390,572 show, the copolymers contain several acrylates or mixtures of acrylates and methacrylates or several methacrylates in addition to styrene.

Moreover, it is mentioned in the resumee of this French Patent Specification, under letter D, that the copolymers described in the specification can be used for coating agents, which have been obtained by mixing the copolymer with an isocyanate prepolymer or a polyisocyanate. The coating agents of the type described in this specification also exhibit a relatively high elasticity after curing and therefore can still be attacked by solvents.

Copolymers which contain hydroxyl groups, are synthesised from monoethylenically unsaturated monomers and have an acid number of up to 40 and contain at least 5 per cent by weight of ethylenically unsaturated carboxylic acid units having active hydrogen atoms and which possess a structure consisting of the selected groupings, which comprise

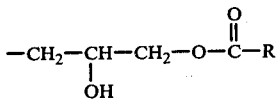

and

wherein R is a tertiary aliphatic hydrocarbon radical having the structure

wherein $R_1$ represents $-CH_3$ and $R_2$ and $R_3$ represent alkyl groups with 1 to 12 carbon atoms, and in which, according to claim 2, the monoethylenically unsaturated monomers are styrene and acrylic acid and the polymer has an acid number of 5 to 40, have already been described in U.S. Pat. Spec. No. 3,330,814.

These known copolymers can be used on their own as baking coating agents (loc. cit., column 1, lines 56-61). A combination of these copolymers with aminoplast resins (loc. cit., column 3, lines 52-62) and with phenol-formaldehyde resins (loc. cit., column 3, lines 63-66) is also mentioned and, in addition, epoxy polyethers (loc. cit., column 3, lines 67-75) can also be used. These coating agents are baked for 30 to 120 minutes at 121° to 205° C. However, the use of these copolymers together with polyisocyanates is not considered. U.S. Pat. Spec. No. 3,330,814 corresponds to British Pat. Specification No. 1,009,217.

Copolymers of styrene, $\alpha,\beta$-ethylenically unsaturated monocarboxylic or dicarboxylic acids and glycidyl esters of $\alpha$-ethylalkanoemonocarboxylic acids are described in German Offenlegungsschrift 2,065,770.

The binder combinations of copolymers containing hydroxyl groups and polyisocyanates give very good water-resistant films, which are resistant even towards detergent solution, and, in addition, have an adequate processing time. However, these combinations have the defect that, in the case of pigmented lacquers containing titanium doxide or pigment carbon black, the resistance to weathering is not adequate for automotive lacquering. The surface hardness and resistance to solvents of the films are also inadequate. The hydroxyl group content of these known copolymers is given as 1.5 to 2.8 %.

Suitable solvents for the manufacture of the new copolymers are those which do not contain any active hydrogen atoms, such a xylene, monoglycol ether-acetates or mixtures of a monoglycol ether-acetate and xylene, examples, of monoglycol acetates which may be mentioned being methylglycol acetate, ethylglycol acetate, isopropylglycol acetate or n-butylglycol acetate.

Glycidyl esters of $\alpha$-alkylalkanemonocarboxylic acids and/or $\alpha,\alpha$-dialkylalkanemonocarboxylic acids of the following empirical formula $C_{13}H_{24}O_3$ are used on their own or as a mixture as component (e). Since the glycidyl radical in the glycidyl ester of the $\alpha$-alkylalkanemonocarboxylic acids and/or $\alpha,\alpha$-dialkylalkanemonocarboxylic acids has an empirical formula of $C_3H_5O$, the $\alpha$-alkylalkanemonocarboxylic acids and $\alpha,\alpha$-dialkylalkanemonocarboxylic acids are mixtures of isomers of those monocarboxylic acids which contain a $C_{10}$ chain. The manufacturing processes for the manufacture of the above-mentioned $\alpha$-alkylalkanemonocarboxylic acids are based on the pioneer work of Dr. H. Koch of the Max-Planck Institute for Coal Research in Mühlheim, Federal Republic of Germany.

The acids are completely saturated and are very highly substituted on the carbon atom in the $\alpha$-position. (Deutsche Farben Zeitschrift, number 10, 16, page 435).

SUMMARY

The present invention relates to a process for the manufacture of soluble copolymers, which contain hydroxyl groups, can be crosslinked with organic polyisocyanates and are based on mixtures of styrene, methyl methacrylate, hydroxyethyl methacrylate, acrylic acid and glycidyl esters of $\alpha$-alkylalkanemonocarboxylic acids and/or $\alpha,\alpha$-dialkylalkanemonocarboxylic acids, by heating in inert organic solvents in the presence of polymerisation initiators and optionally chain stoppers, simultaneous esterification and polymerisation taking place, characterised in that a mixture which consists of (a) 20-25.9% by weight of styrene,
(b) 20-24% by weight of methyl methacrylate,
(c) 18-24% by weight of hydroxyethyl methacrylate,
(d) 8.5- 11% by weight of acrylic acid and
(e) 29.0-35% by weight of glycidyl esters, of $\alpha$-alkylalkanemonocarboxylic acids and/or $\alpha,\alpha$-dialkylalkanemonocarboxylic acids, having the empirical formula $C_{13}H_{24}O_3$ and in which the amounts of the compounds a to e must add up to 100% by weight, is reacted and the component (sic) c, d and e are employed in amounts such that the reaction product has a hydroxyl group content of 4.0 to 5.5, preferably 4.1 to 4.8% by weight, based on the weight of the starting monomers, and the components d and e are employed in a molar ratio of d:e of 1.01 up to 1.1 to 1.0 and the reaction batch is reacted until the reaction product has acid numbers of between 6 and 12.

In the best embodiment of the process of this invention, a mixture which consists of (a) 21-23% by weight of styrene,
(b) 20-22% by weight of methyl methacrylate,
(c) 18-20% by weight of hydroxyethyl methacrylate,
(d) 8.5-9% by weight of acrylic acid and
(e) 29-31% by weight of glycidyl esters, of $\alpha$-alkylalkanemonocarboxylic acids and/or $\alpha,\alpha$-dialkylalkanemonocarboxylic acids, having the empirical formula $C_{13}H_{24}O_3$ and in which the amounts of the compounds a to e must add up to 100% by weight, is reacted and the components c, d and e are employed in amounts such that the reaction product has a hydroxyl group content of 4.0 to 5.5, perferably 4.1 to 4.8% by weight, based on the weight of the starting monomers, and the components d and e are employed in a molar ratio of d:e of 1.01 up to 1.1 to 1.0 and the reaction batch is reacted until the reaction product has acid numbers of between 6 and 12.

A preferred embodiment of the process consists in using xylene, monoglycol ether-acetates or mixtures of xylene and monoglycol ether-acetates as the organic solvent and in this case 0.8 to 1.5% by weight of di-tert.-butyl peroxide is employed as the polymerisation initiator and 0.1 to 1% by weight of dodecylmercaptan are employed as the chain stopper, the percentage data, by weight, for the polymerisation initiator and the chain stopper being based on the sum of the weights of the monomers a to e which are employed and are to be reacted.

The most preferred embodiment of the invention is characterised in that the solvent, that is to say xylene or a mixture of xylene and ethylglycol acetate, and the glycidyl ester (e) are heated to 140° to 150° C., a further mixture of the monomers (a) to (d), di-tert.-butyl peroxide and dodecylmercaptan is added at a uniform rate in the course of 2 to 4 hours and the mixture is polymerized, and condensed, at a constant temperature for a further 4–8 hours.

The new copolymers are manufactured by polymerisation in a solvent, the glycidyl ester being dissolved in the solvent and the monomers (a) and (d), with the initiators and chain stoppers, being added at elevated temperature — about 140° to 150° C. - and the mixture being condensed and polymerised at the same time. Di-tert.-butyl peroxide is employed as the initiator. The desired copolymers are obtained when tertiary dodecylmercaptan is additionally used.

The new copolymers are manufactured with a solids content of 61 to 70% by weight.

The viscosities of solutions having a resin concentration of 50%, which are obtained by dilution with xylene or with ethylglycol acetate, give a flow time of 100 to 200 seconds, measured at 23° C. in a DIN cup with a 4 mm outlet orifice.

The new copolymers have a hydroxyl group content of 4.0 to 5.5%, perferably 4.1 to 4.8%. The hydroxyl group content is based on the solids content in the copolymer.

After removing the solvent, the resulting copolymers, manufactured according to the invention, have a melting range of 60° to 80° C., preferably 65° to 75° C. For each copolymer which is manufactured in a reaction batch according to the invention, the start and the end of the melting point range are separated by a maximum of 5° C. This characteristic is especially important with regard to the pigment-binding capacity and the good resistance to weathering of the binder combinations manufactured therefrom. If the melting points of the copolymers are below 60° C., the films dry too slowly on crosslinking with polyisocyanates. Moreover, too much dust gets into the material and the surfaces of the films are not sufficiently resistant to scraping for use in automatic washing machines. If the copolymers have melting points which are above 80° C., the pigment-binding capacity, the gloss retention on weathering and the elasticity are too low.

For special purposes, copolymers according to the invention which have different melting point ranges within the indicated values can be manufactured and mixed. In copolymer mixtures of this type the start and end of the melting point range are separated by a larger value (more than 3°) and such mixtures are also suitable for the present invention.

The reaction for the manufacture of the new copolymers is carried out in such a way that the carboxyl groups of components (d) so react with the glycidyl groups of the α-alkylalkanemonocarboxylic acids and/or α,α-dialkylalkanemonocarboxylic acids ester of components (e) that a free hydroxyl group results during the formation of the ester, which group is necessary for subsequent use of the copolymers, for example for crosslinking with the organic polyisocyanates. The reaction between the carboxyl group and the glycidyl group is effected by employing 1.01 to 1.1 carboxyl groups per glycidyl group. The copolymers manufactured in this way give acid numbers of between 6 and 12.

The hydroxyl group content of the copolymers is 4 to 5.5, preferably 4.1 to 4.8% by weight.

The content of hydroxyl groups in the copolymers is calculated in accordance with the following equation:

$$\% \text{ OH} = \frac{\text{weight taken of the}}{\text{1 mol OH in g} \times \text{compound containing hydroxyl groups} \times 100}{\text{molecular weight of the compound} \times \text{total weight taken of}}{\text{containing hydroxyl groups} \quad \text{components a to e}}$$

For example, the molecular weight of the reaction product obtained from 1 mol of acrylic acid, which corresponds to 72 g of acrylic acid, and 1 mol of the glycidyl ester, of α,α-dialkylalkanemonocarboxylic acids, which has the empirical formula $C_{13}H_{24}O_3$ and an average epoxide equivalent of 245, which corresponds to 245 g of the glycidyl ester, is 317.

Under the conditions of an equivalent conversion, for example, there are 8.78% by weight of acrylic acid for 29.4% by weight of the abovementioned glycidyl ester, which corresponds to 33.51% by weight of the compound containing hydroxyl groups.

The abovementioned equation can then be expressed in figures as follows:

$$\frac{17 \times 38.62 \times 100}{317 \times 100 \text{ g total weight taken of components a to e}} = 2.07 \% \text{ OH}$$

The other compound containing hydroxyl groups, that is to say hydroxyethyl methacrylate, has a molecular weight of 130. For 18.8% by weight of hydroxyethyl methacrylate, the following OH percentages are obtained according to the equation, expressed in figures as follows:

$$\frac{17 \times 18.82 \times 100}{130 \times 100 \text{ g total weight taken of components a to e}} = 2.46 \% \text{ OH}$$

The sum of the two compounds containing hydroxyl groups, that is to say the reaction product obtained from the glycidyl ester and acrylic acid and hydroxyethyl methacrylate, gives a hydroxyl group content of 4.53% of OH.

Whilst meeting the condition that components a, b and e are employed in amounts such that the copolymers have a hydroxyl group content of 4.0 to 5.5% by weight, and preferably 4.1 to 4.8% by weight, the amounts of components d and e should be so adjusted relative to component c that the desired hydroxyl group content is achieved.

This means that when relatively small percentages by weight of components d and e are employed, relatively high percentages by weight of component c must be selected in order to manufacture the copolymers according to the invention. When relatively large percentages by weight of components d and e are employed, relatively low percentages by weight of component c must be selected in order to carry out the process according to the invention.

These new copolymers can be used as component A, together with a polyisocyanate component B, in reactive lacquers.

The following compounds are examples of polyisocyanates which can be employed as component B: toluylene-2,4-dissocyanate, toluylene-2,6-diisocyanate, cyclohexylene-1,4-diisocyanate, diphenylmethane-4,4'-diisocyanate, naphthylene-1,5-diisocyanate 4,4'-, 4,2-triphenylmethane-triisocyanate, 1-(isocyanatophenyl)-ethyl isocyanate or xylylene-diisocyanate, diisocyanates substituted by fluorine, ethylene glycol diphenyl ether-2,2'-diisocyanate, diethylene glycol diphenyl ether-2,2'-diisocyanate, 1,1'-dinaphthyl-2,2'-diisocyanate, biphenyl 2,4'-diisocyanate, biphenyl-4,4'-diisocyanate, benzophenone-3,3'-diisocyanate, fluorene-2,7-diisocyanate anthraquinone2,6diisocyanate, pyrene-3,8-diisocyanate, chrysene-2,8-diisocyanate, 1-methylbenzene-2,4,6-triisocyanate, naphthalene-1,3,7-triisocyanate, biphenylmethane-2,4,4'-triisocyanate, triphenylmethane-4,4',4''-triisocyanate, 3'-methoxyhexane-diisocyanate, octanediiso . . . (sic), ω,ω-diisocyanato-1,4-diethylbenzene, ω,ω-diisocyanato-1,4-dimethylnaphthalene, cyclohexane-1,2-diisocyanate, 1-isopropylbenzene-2,4-diisocyanate, 1-chlorobenzene-2,4-diisocyanate, 1-fluorobenzene-2,4-diisocyanate, 1-nitrobenzene-2,4-diisocyanate, 1-chloro-4-methoxybenzene-2,5-diisocyanate, azobenzene-4,4'-diisocyanate, benzeneazo-naphthalene-4,4'-diisocyanate, diphenyl ether-2,4-diisocyanate and diphenyl ether-4,4'-diisocyanate.

Reaction products, containing isocyanate groups, of polyhydric alcohols with polyisocyanates, for example the reaction product of 1 mol of trimethylolpropane with 3 mols of toluylene-diisocyanate, and also trimerised or polymerised isocyanates, such as are described in, say, German Pat. Specification No. 951,168, may also be mentioned.

A reaction product, containing biuret groups, of 1 mol of water and 3 mols of hexamethylene-diisocyanate, which has a NCO content of 16–17 % by weight, can also be used. The last-mentioned reaction product of water and hexamethylene-diisocyanate is particularly preferred. The NCO content of the reaction product is that for a 75 % strength solution in xylene/ethylglycol acetate.

Component (A) in reactive lacquers, which consists of a copolymer containing hydroxyl groups, is reacted with component (d), that is to say acrylic acid, and component (e), that is to say a glycidyl ester of the indicated type, in accordance with the statements in the pre-characterising clause of claim 1 and, during the manufacture of the copolymer, the carboxyl group of component (d) reacts with the glycidyl groups of the α-alkylalkanemonocarboxylic acid and/or α,α-dialkylalkanemonocarboxylic acid component (e) in ssuch a way that a free hydroxyl group results during the formation of the ester, which hydroxy group is necessary for cross-linking with the organic polyisocyanates. The formula which follows represents the glycidyl ester of α-alkylalkanemonocarboxylic acids and/or α,α-dialkylalkanemonocarboxylic acids, which has the empirical formula $C_{13}H_{24}O_3$:

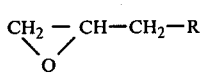 (e)

The radical shown is the glycidyl radical; R is the α-alkylalkanemonocarboxylic acid radical and/or the α,α-dialkylalkanemonocarboxylic acid radical.

Since the empirical formula indicated in the foregoing text was that for the glycidyl ester as a whole, the empirical formula for the carboxylic acid radical R shown in formula (e) is $C_{10}H_{19}O_2$.

This glycidyl ester component (e) is esterified with acrylic acid and copolymerisation of the acrylic acid radical with styrene, methyl methacrylate and hydroxyethyl methacrylate takes place at the same time as the esterification.

Since it is known that no water is eliminated during the esterification of a glycidyl group with an acid but that a OH group is formed by cleavage of the glycidyl group, the esterification product obtained from component (d) and component (e) can be represented by the following formula:

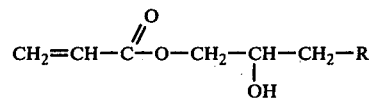

In this formula R has the same meaning as in formula (e).

Taking into account what has been discussed above, the invention also relates to a process for the manufacture of coatingsd from polyhydroxy compounds, which are based on copolymers, which contain hydroxyl groups and are reaction products of mixtures of styrene, methyl methacrylate, hydroxyethyl methacrylate, acrylic acid and glycidyl esters of α-alkylalkanemonocarboxylic acids and/or α,α-dialkylalkanemonocarboxylic acids, and from organic polyisocyanates in solvents which have no active hydrogen atoms, characterised in that a mixture is used which consists of
A. a copolymer, which contains hydroxyl groups and consists of
  (a) 20–25.9% by weight of styrene,
  (b) 20–24% by weight of methyl methacrylate,
  (c) 18–24% by weight of hydroxyethyl methacrylate,
  (d and e) 37.5–46.0% by weight of a reaction product of the formula

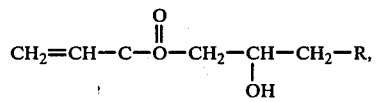

wherein R is the radical of α-alkylalkanemonocarboxylic acids and/or α,α-dialkyalkanemonocarboxylic acids and the radical has the empirical formula $C_{10}H_{19}O_2$, and in which the incorporated components (a), (b), (c), (d) and (e) add up to 100% by weight, dissolved in solvents which do not contain active hydrogen atoms and (B) an organic polyisocyanate, which is added to (or reacted with) the copolymer (A), the amounts of the copolymer (A) and the polyisocyanate (B) in the mixture adding up to 100 percent by weight, and this mixture is shaped or applied to suitable substrates and the solvent is then removed, in order to obtain the finished coating.

A further embodiment of the process for the manufacture of the coatings is characterised in that 60–80% by weight of component (A), the copolymer which contains hydroxyl groups and is dissolved in solvents which do not contain active hydrogen atoms, and 20–40% by weight of (B), the organic triisocyanate, are mixed (or reacted), the amounts of the copolymer and polyisocyanate adding up to 100% by weight.

A specific embodiment of the above process is characterised in that component (A) is employed in an amount of 60–70% by weight, component (B) is employed in an amount of 20–40% by weight and component (C), which is in the form of a mixture of a monomethylol-pentamethoxymethylmelamine or dimethyloltetramethoxymethylmelamine and/or trimethyloltrimethoxymethylmelamine, is employed in an amount of 1–10% by weight.

A further embodiment for the manufacture of coatings is characterised in that component (A) is employed in an amount of 63–68% by weight and component (B) is employed in an amount of 32–37% by weight and the organic triisocyanate is a reaction product of 3 mols of hexamethylene-diisocyanate and 1 mol of water.

A further embodiment for the manufacture of coatings is characterised in that the component (A) is employed in an amount of 63–68% by weight and the component (B), which is an organic polyisocyanate which contains biuret groups, has a NCO content of 16.0–17% and is a reaction product obtained from 3 mols of hexamethylene-diisocyanate and 1 mol of water, is employed in an amount of 32–37% by weight.

A further embodiment for the manufacture of coatings is characterised in that a polymer which contains hydroxyl groups and has hydroxyl numbers of 4 to 5.5, preferably 4.1 to 4.8, % by weight, based on the weight of the starting monomers, and acid numbers between 6 and 12, is used.

A further embodiment for the manufacture of coatings is characterised in that a copolymer which contains hydroxyl groups and, after removal of the solvent, has a melting range of 60 to 80° C, preferably 65 to 75° C, is used, the start and end of the melting range of the copolymer being separated by at most 5° C.

A further embodiment for the manufacture of coatings is characterised in that the reaction of the copolymer containing hydroxyl groups with the organic polyisocyanate is carried out using amounts such that there are 0.7–1.2 NCO groups per hydroxyl groups, the preferred range being 0.9–1.1 NCO groups per hydroxyl group.

The invention also relates to a reactive lacquer as a binder for carrying out the above process and is characterised in that the reactive lacquer contains, as the binder component, a component (A) which consists of 60–80% by weight of copolymers which contain hydroxyl groups and which consist of
 (a) 20–25.9% by weight of styrene,
 (b) 20–24% by weight of methyl methacrylate,
 (c) 18–24% by weight of hydroxyethyl methacrylate and
 (d and e) 37.5–46% by weight of a reaction product of the formula

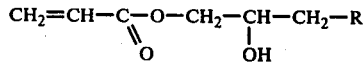

wherein R is the radical of α-alkylalkanemonocarboxylic acids and/or α,α-dialkylalkanemonocarboxylic acids and the radical has the empirical formula $C_{10}H_{19}O_2$, and in which the incorporated components (a), (b), (c), (d) and (e) add up to 100% by weight.

The invention also relates to a reactive lacquer as a binder for carrying out the above process and is characterised in that the reactive lacquer contains, as component (A), which is the binder component, a copolymer in an amount of 63 to 68% by weight and, as component (B), an organic triisocyanate, which has a NCO content of 16.5–17% and has been obtained by reacting 3 mols of hexamethylene-diisocyanate and mol of water, in an amount of 32 to 37% by weight.

In order to use the new copolymers, the mixtures which consist of copolymers A, which contain hydroxyl groups and contain a solvent, and the polyisocyanate B are applied to the appropriate substrates in the simplest manner conceivable, say after the addition of known auxiliaries, such as flow-control agents, pigments or dyestuffs, by spraying, dipping, casting or brushing or by other suitable measures, and the sheet-like structures are dried at room temperature; in special cases the coatings can be baked and this essentially depends on the substrates used and on the requirements which the coatings have to meet in practice. It can also be advantageous additionally to use reactive melamine resins. The reactive melamine resins can be added in amounts of about 1 to 10% by weight, based on the weight of the binder component, and as a result it is possible to observe, in particular, an increase in the gloss of the sheet-like structure.

Examples of reactive melamine resins which can be used are monomethylol-pentamethoxymethylenemelamine, dimethyloltetramethoxymethylenemelamine or trimethylol-trimethoxymethylenemelamine, on their own or as a mixture.

When the new copolymers are used in the reactive lacquers which have already been discussed, the reaction and the application of the sheet-like structures to the substrate are carried out in solution. Suitable solvents are, for example, ethyl acetate, butyl acetate, ether-acetates, diethylglycol diacetate and aromatic solvents, such as benzene, toluene or xylene. The concentration of the solutions can vary within wide limits and essentially depends on the solubility of the components. Solutions which have a solids content of 20–80% by weight are preferably used.

The copolymers obtainable according to the invention can be employed together with polyisocyanates in the reactive lacquers, which have already been discussed, in order to produce coatings or coverings on substrates of very diverse types, for example porous or non-porous substrates, such as textile non-wovens, leather or plastics. The production of coatings on wood or metals should be singled out in particular. In every case coatings which have a high gloss and a very hard surface and are pore-free, elastic and resistant to solvents are obtained. Such coatings also exhibit an outstanding resistance to weathering and resistance to yellowing.

When the new copolymers are used in reactive lacquers, components A and B are preferably used in the following amounts:
 (A) 60–80% by weight of copolymers which contain hydroxyl groups and are manufactured according to the invention and
 (B) 20–40% by weight of an organic polyisocyanate, (A) and
 (B) having to add up to 100% by weight.

A particularly preferred embodiment comprises the use in amounts of:
 (A) 63–68% by weight of copolymers which contain hydroxyl groups and are manufactured according to the invention and
 (B) 32–37% by weight of an organic triisocyanate, which has been obtained by reacting 3 mols of hexamethylene-diisocyanate and 1mol of water, A and B having to add up to 100% by weight.

EXAMPLE 1

Manufacture of the copolymer 1:

In a flask equipped with a stirrer, a reflux condenser and a thermometer, 325 g of xylene, 155 g of ethylglycol acetate and 214 g of glycidyl esters of α,α-dialkylalkane-monocarboxylic acids, having the empirical formula $C_{13}H_{24}O_3$ and an average epoxy equivalent of 245, hereinafter merely referred to as glycidyl esters of α,α-dialkylmonocarboxylic (sic) acids, are heated to 147° C. and a mixture consisting of 145 g of methyl methacrylate, 135 g of hydroxyethyl methacrylate, 2 g of tert.-dodecylmercaptan, 160 g of styrene, 63 g of acrylic acid and 7 g of di-tert.-butyl peroxide is added at a uniform rate in the course of two hours and the reaction mixture is polymerised, and condensed, at 140 to 150° C. for about 6 hours. The product has a solids content of 60% by weight. A solution diluted to a 50% solids content with xylene gives viscosities of 300 – 400 seconds, measured at 20° C. in a DIN cup with a 4 mm outlet orifice. The hydroxyl group content is 4.53% ±0.2, based on the solids content in the copolymer. After removing the solvent, the copolymer has a melting range of 72 to 77° C. The acid number of the copolymer is 7–8.

Comparative Experiment 1 (taking French Patent Specification 1,556,309 into account) to demonstrate the technical advance achieved French Pat. Specification No. 1,556,309 gives the following values for the hydroxyl group contents in Examples 1 to 10:

| | |
|---|---|
| Example 1 | =0.8% of hydroxyl groups, based on the copolymers |
| Example 2 | =1% of hydroxyl groups, based on the copolymers |
| Example 3 | =1.26% of hydroxyl groups, based on the copolymers |
| Example 4 | =1.52% of hydroxyl groups, based on the copolymers |
| Example 5 | =1.41% of hydroxyl groups, based on the copolymers |
| Example 6 | =1.41% of hydroxyl groups, based on the copolymers |
| Example 7 | =1.66% of hydroxyl groups, based on the copolymers |
| Example 8 | =1.85% of hydroxyl groups, based on the copolymers |
| Example 9 | =1.85% of hydroxyl groups, based on the copolymers |
| Example 10 | =3.18% of hydroxyl groups, based on the copolymers |

Copolymers which have a hydroxyl group content of 4 - 5.5% are not manufactured in any of the examples. If copolymers are manufactured in accordance with the instructions of Frence Patent Specification No. 1,556,309, very highly viscous copolymer solutions are obtained and the copolymers contained therein have a considerably higher melting point and, moreover, a broader melting range than the copolymers manufactured according to the invention. The films obtained are brittle and show poor adhesion to various substrates, such as, for example, steel, plastics or non-wovens. Moreover, the known copolymers display a poor pigment-binding capacity and have a poor gloss. If the known copolymers are employed as the binder component, in combination with polyisocyanates, for the coating compositions, the reactive lacquers have a very short pot life and thus a very short processing time.

Manufacture of the known copolymer having a hydroxyl group content of 4.53%.

The procedure is as described in the French patent specification, but the monomers are used in the same amount as in the process according to the invention.

20.22% by weight of methyl methacrylate,
22.34% by weight of styrene,
18.82% by weight of hydroxyethyl methacrylate and
38.62% by weight of the reaction product according to reaction A.
10% by weight of ethylglycol acetate,
30% by weight of ethyl acetate,
20% by weight of butyl acetate,
10% by weight of xylene and
30% by weight of toluene.

The initiator, that is to say azo-bis-isobutyronitrile, and the chain regulator, that is to say laurylmercaptan, were disslved in toluene and then added in the course of 2 hours to the solvent, which was boiling under reflux, and the monomer mixture, and the reaction mixture was polymerised. The 50% strength by weight copolymer solution has a viscosity of 800 ±50 seconds, measured at 23° C. in a DIN cup with a 4 mm outlet orifice. The acid number is 10. After removing the solvent, the copolymer has a melting range of 100 to 110° C.

The resin solution shows a strong turbidity. The film, dried in air, is likewise turbid and was graded 3–4, whilst the film baked at 160° C. was graded 3.

Grading of the turbidity of the film:

0 = no turbidity of the film
1 = slight turbidity of the film, bluish appearance of the film
2 = strong turbidity of the film, blue appearance of the film
3 = strong turbidity of the film, grey appearance of the film
4 = strongest turbidity of the film, white appearance of the film

EXAMPLE 2

Reactive lacquer based on 64.6% by weight of a copolymer and 35.4% by weight of an organic triisocyanate, both based on the weight of solids (I) 562 g of the copolymer solution from Example 1 (dissolved solids 60% by weight) are ground with 412 g of titanium dioxide (rutile), 187 g of xylene and 187 g of ethylglycol acetate to give a lacquer.

(II) 250 g of a 75% strength by weight solution of a triisocyanate, which has a NCO content of 16.5–17.0% by weight and which has been obtained by reacting 3 mols of hexamethylenediisocyanate and 1 mol of water, dissolved in a 1:1 mixture of xylene/ethyl acetate, are added to the above pigmented lacquer batch I and the mixture is diluted with xylene and butyl acetate in a weight ratio of 1:1 to the spraying viscosity and applied to steel sheets to give a dry coating thickness of 45–50 μm and the coating is dried in air. The coating is no longer tacky after 30–40 minutes. The lacquer film has crosslinked after seven days in air at 20° C. The following tests are then carried out: a cross-cut was made and the sheet was then warmed to 60 to 70° C. and hot water was allowed to act thereon for 10–15 minutes: result: no swelling at the cross-cut and it was not possible to scrape off the film, while it was still warm, with a fingernail.

A film on steel sheets which was dried in air for ten days shows no blistering in the condensation water test at 50° C. after 25 days. The gloss is still completely retained.

Prior to testing, the film had a gloss of 100%, measured by the Gardner method.

EXAMPLE 3

Reactive lacquer based on 64.6% by weight of copolymer 2 and 35.4% by weight of an organic triisocyanate, both based on the weight of solids.

(I) 281 g of the copolymer solution from Example 1 (dissolved solids 60% by weight) are ground with 16.8 g of pigment Carbon Black FW 200, which is described in the company leaflet from Messrs. Degussa, and xylene and ethylglycol acetate in a mixing ratio of 1:1 to give a lacquer. Grinding time: about 60 minutes in a sand mill.

(II) 2 g of calcium naphthenate containing 4% of calcium, 281 g of the copolymer solution from Example 1, 2 g of LO 50 silicone oil, which is described in the company leaflet from Messrs. Bayer and is dissolved in xylene to give a 1% strength solution, and 312 g of a 75% strength by weight solution of the triisocyanate described in Example 2, which has a NCO content of 16.5–17% by weight and has been obtained by reacting 3 mols of hexamethylene-diisocyanate and 1 mol of water, dissolved in a 1:1 mixture of xylene/ethylglycol acetate, are added to the pigmented lacquer solution described under I and the mixture is diluted with xylene and butyl acetate in a mixing ratio of 1:1 to the spraying viscosity and applied to steel sheets or steel sheets (sic) to give a dry film coating thickness of 4–50μ and the film is dried in air for 7 days. The cured lacquer has a gloss of 97%, measured by the Gardner method.

Further comparative experiments to demonstrate the technical advance achieved

In order to determine the "pot life," the copolymer manufactured according to the invention which is listed in the table which follows, and, for comparison, the known copolymer (Comparison Experiment 1), . . . (sic) with the aliphatic triisocyanate which has been obtained by reacting 3 mols of hexamethylene-diisocyanate and 1 mol of water. The mixing ratios for the copolymers and polyisocyanate were 65% by weight of copolymer:35% by weight of polyisocyanate, based on the solids content. Using a solvent mixture consisting of xylene and butyl acetate in a weight ratio of 1:1, the mixtures were diluted to a viscosity of 25 seconds flow time, measured in a DIN cup with a 4 mm outlet orifice, and the rise in the viscosity was determined as a function of time at 23° C. As can be seen from the table which follows, the copolymers manufactured according to the invention are superior to the known copolymer according to French Patent Specification No. 1,556,309, since the copolymers manufactured according to the invention have a more favourable "pot life" with regard to a slower rise in viscosity or gelling, which indicates that processing of the lacquers will be considerably more advantageous.

| Further Examples 4 to 9 Monomer component | Examples | 4 | 5 | 6 | 7 | 8 | 9 |
|---|---|---|---|---|---|---|---|
| a | Styrene in per cent by weight | 21 | 23 | 21.5 | 21 | 21 | 22 |
| b | Methyl methacrylate in per cent by weight | 20 | 20 | 20 | 22 | 21 | 20.5 |
| c | Hydroxyethyl methacrylate in per cent by weight | 19 | 19.5 | 18.5 | 19.5 | 18 | 20 |
| d | Acrylic acid in per cent by weight | 9 | 8.5 | 9 | 8.5 | 9 | 8.5 |
| e | Glycidyl esters of α alkylakanemonocarboxylic acid and/or α,α-dialkylalkanemonocarboxylic acids, having the empirical formula $C_{13}H_{24}O_3$ | 31 | 29 | 31 | 29 | 31 | 29 |

The Examples 4 to 9 were carried out by a procedure analogous to the instructions in Example 1. With polyisocyanates, the copolymers prepared according to the Examples 4 to 9 give reactive lacquers which result in coatings having good properties. With polyisocyanate, the copolymer prepared according to Example 1 gives reactive lacquers which result in the best coatings.

| Experiments to determine the "pot life" for unpigmented lacquers | | Viscosity, measured in a DIN cup with a 4 mm outlet orifice, as a function of time | |
|---|---|---|---|
| Copolymer used | Combination ratio | after 4 hours | after 6 hours |
| Example 1 according to the invention | 65% by weight of the copolymer 35% by weight of the triisocyanate manufactured from 3 mols of hexamethylene-diisocyanate and 1 mol of water | 33 seconds | 36 seconds |
| Comparative Experiment 1 | | 60 seconds | gelling |

| for lacquers pigmented with TiO$_2$ | | | |
|---|---|---|---|
| Copolymer used | Combination ratio | Gloss by the Lange method | Erichsen deep-drawing |
| Example 2 according to the invention | 64.6% by weight of the copolymer and 35.4% by weight of the triisocyanate manufactured from 3 mols of hexamethylene-diisocyanate and 1 mol of water | 98% | 8mm |
| Comparative Experiment 1 | | 85% | 5.0 mm |

| for lacquers pigmented with pigment Carbon Black | | |
|---|---|---|
| Copolymer used | Combination ratio | Gloss by the Gardner method |
| Example 3 according to the invention | 64.6% by weight of the copolymer and 35.4% by weight of the triisocyanate manufactured from 3 mols of hexamethylene-diisocyanate and 1 mol of water | 97% |
| Comparative Experiment 1 | | 78% |

The properties of the copolymer solutions according to the invention in respect of the extent to which they can be diluted with other organic solvents are summarised in the table which follows:

| | | | |
|---|---|---|---|
| Special benzine 100/140 | ○ | Acetone | ● |
| Test benzine | ○ | Methyl ethyl ketone | ● |
| Turpentine oil | ○ | Methyl isobutyl ketone | ◉ |
| Toluene | ● | Cyclohexanone | ● |
| Xylene | ◉ | Ethyl acetate | ○ |
| Solvent naphtha | ◉ | Butyl acetate | ● |
| Tetrahydronaphthalene | ◉ | Methylglycol acetate | ● |
| Decahydronaphthalene | ○ | Ethylglycol acetate | ● |
| Trichloroethylene | ● | | |

● = can be diluted to any desired extent
◐ = can be diluted to a substantial extent
◉ = can be diluted to a restricted extent
○ = can be diluted to a very restricted extent or cannot be diluted The main fields of application for the new copolymers in combination with aliphatic and aromatic polyisocyanates or their mixtures - are air-drying and oven-drying lacquer coatings on metal, wood and plastic. Two-component lacquers of this type are preferably employed when the properties expected from the air-dried or force-dried lacquers are those customarily offered only by baking lacquers.

These new reactive lacquers are employed as binders, especially for the car touch-up lacquer field and for the lacquer-coating of buses and lorries.

In combination with aliphatic polyisocyanates, the copolymers give lacquer coatings which have good body, are free from yellowing and have excellent resistance to weathering and show excellent retention of gloss.

A certain degree of yellowing must be expected when the copolymers are crosslinked with aromatic polyisocyanates.

In accordance with their higher degree of crosslinking compared with comparable good commercially available products for the same purpose, reactive lacquers based on the invention display a high resistance to scraping and abrasion, associated with a good resistance to solvents. The good resistance to water and aggressive chemicals is also to be singled out.

In addition to drying in air, such lacquers can be baked within a wide temperature range; thus, for example, the films are completely cured in 30 minutes at 130° C.

The lacquer coatings cured at room temperature are not inferior to the baked films in respect of their resistance to weathering.

The new copolymers have a high pigment-binding capacity. All neutral pigments and fillers are suitable for the pigmentation. Highly basic pigments and pigments which contain soluble metal compounds can exert a catalytic action on the crosslinking and this results in shortening of the processing time of the ready-mixed lacquer batches.

Butyl acetate in combination with ethylglycol acetate and/or xylene has proved the most important diluent for the reactive lacquers of the invention.

Since hydroxyl groups react with polyisocyanates, care must be taken that only those solvents which are anhydrous and contain no hydroxyl groups are used.

Lacquer films based on the reactive lacquers of this invention are distinguished by good flow properties; small additions of silicone oil can further improve these properties. Taking into account the fact that the processing time must be adequate, compounds suitable for accelerating drying are, in particular, organic metal salts or tertiary amines.

Further Example 10 to 15, of reactive lacquers

| Ex. | Copolymers, relative to solids | Triisocyanate manufactured from 3 mols of hexa-methylene-diisocyanate and 1 mol of water, relative to solids |
|---|---|---|
| 10 | Copolymer according to Example 4 65% by weight | 35% by weight |
| 11 | Copolymer according to Example 5 67% by weight | 33% by weight |
| 12 | Copolymer according to Example 6 70% by weight | 30% by weight |
| 13 | Copolymer according to Example 7 60% by weight | 40% by weight |
| 14 | Copolymer according to Example 8 75% by weight | 25% by weight |
| 15 | Copolymer according to Example 9 80% by weight | 20% by weight |

The reactive clear lacquers indicated in Examples 10 to 15 were applied to the substrate to be lacquered. The resulting film was crosslinked in air for about 5 to 7 days at room temperature. In the case that the films are intended to be crosslinked more rapidly, these are baked in the course of 20 to 30 minutes at 130° C.

I claim:

1. Process for the manufacture of coatings from copolymers containing hydroxyl groups, which copolymers are reaction products of mixtures of styrene, methyl methacrylate, hydroxyethyl methacrylate, acrylic acid and glycidyl esters of α-alkylalkanemonocarboxylic acids and/or α,α-dialkylalkanemonocarboxylic acids or products of a reaction of acrylic acid and a glycidyl ester followed by copolymerization with the remaining compounds of the aformentioned mixtures, and from an organic polyisocyanate in a solvent comprising no active hydrogen atoms, wherein a mixture consisting of (A) a copolymer containing hydroxyl groups and consisting of
 (a) 20–25.9% by weight of styrene,
 (b) 20–24% by weight of methyl methacrylate,
 (c) 18–24% by weight of hydroxyethyl methacrylate,
 (d) 8.5–11% by weight of acrylic acid and
 (e) 29.0–35.0% by weight of glycidyl ester of α-alkylalanemonocarboxylic acid and/or α,α-dialkylalkanemonocarboxylic acid having the empirical formula $C_{13}H_{24}O_3$ or wherein components d) and e) are incorporated as a prereacted product of the formula

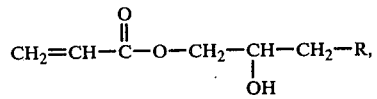

wherein R is the radical of α-alkylalkanemonocarboxylic acid and/or α,α-dialkylalkanemonocarboxylic acid and the radical has the empirical formula $C_{10}H_{19}O_2$ in an amount of 37.5–46% by weight, and wherein the incorporated components (a), (b), (c), (d), and (e) have a total of 100% by weight, dissolved in a solvent containing no active hydrogen atoms, and (B) an organic polyisocyanate, the amount of the copolymer (A) and the polyisocyanate (B) in the coating mixture adding up to 100 percent by weight, and this mixture is shaped or applied to suitable substrate and the solvent is then removed, in order to obtain the finished coating.

2. Process according to claim 1, characterised in that 60-80% by weight of component (A), the copolymer which contains hydroxyl groups, is dissolved in a solvent which does not contain active hydrogen atoms, and 20-40% by weight of (B), the organic polyisocyanate, are reacted, the amounts of the copolymer and polyisocyanate adding up to 100% by weight.

3. A method which comprises applying to a substrate a reactive lacquer composition prepared by the process of claim 2, and drying the resulting lacquered substrate.

4. Process according to claim 1, characterised in that component (A) of said coating mixture is employed in an amount of 60-70% by weight, component (B) is employed in an amount of 20-40% by weight and a third component (C), which is at least one of monomethylol-pentamethoxymethylmelamine, dimethylol-tetramethoxymethylmelamine, or trimethyloltrimethoxymethylmelamine, is added in an amount of 1-10% by weight to said coating mixture.

5. Process according to claim 1, characterised in that component (A) of said coating mixture is employed in an amount of 63-68% by weight and the polyisocyanate component (B) is employed in an amount of 32-37% by weight, said polyisocyanate being an organic triisocyanate which is a reaction product of 3 mols of hexamethylene-diisocyanate and 1 mol of water.

6. A reactive lacquer composition for carrying out the process according to claim 5, wherein the reactive lacquer contains as binder 63 to 68 percent by weight of copolymer component (A) and, as component (B), an organic triisocyanate having an NCO group content of 16.5 to 17 percent and which organic triisocyanate has been obtained by reacting 3 mols of hexamethylene-diisocyanate and 1 mol of water, in an amount of 32 to 37 percent by weight.

7. A method which comprises applying to a substrate a reactive lacquer composition of claim 6, and drying the resulting lacquered substrate.

8. Process according to claim 1, characterized in that the component (A) the hydroxy group containing copolymer is employed in an amount of 63-68% by weight and the component (B), the organic polyisocyanate, contains biuret groups, has a NCO content of 16.0-17%, is a reaction product obtained from 3 mols of hexamethylene-diisocyanate and 1 mol of water, and is employed in an amount of 32-37% by weight.

9. A reactive lacquer composition for carrying out the process according to claim 1 wherein the binder of the reactive lacquer composition consists essentially of 60 to 80 percent by weight of a copolymer containing hydroxyl groups and which consists of
 (a) 20 to 25.9 percent by weight of styrene,
 (b) 20 to 24 percent by weight of methyl methacrylate,
 (c) 18 to 24 percent by weight of hydroxyethyl methacrylate, and
 (d and e) 37.5 to 46 percent by weight of an ester of the formula

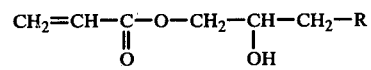

which is the reaction product of acrylic acid (d) and glycidyl esters of α-alkylalkanemonocarboxylic or α,α-dialkylalkanemonocarboxylic acids or mixtures thereof having the empirical formula $C_{13}H_{24}O_3$, (e) and wherein R is the radical of the α-alkylalkanemonocarboxylic or α,α-dialkylalkanemonocarboxylic acids or mixtures thereof having the empirical formula $C_{10}H_{10}O_2$, and in which the incorporated components (a), (b), (c), (d) and (e) add up to 100 percent by weight.

10. Process according to claim 1, characterized in that the copolymer component (A) which contains hydroxyl groups has a hydroxyl number of 4 to 5.5, percent by weight, based on the weight of the starting monomers, and an acid number between 6 and 12.

11. Process according to claim 1 characterised in that the copolymer component (A) which contains hydroxyl groups, after removal of the solvent, has a melting range of 60 to 80° C., the start and ane of the melting point range of the copolymer being separated by at most 5° C.

12. Process according to claim 1, characterised in that the reaction of the component (A) copolymer containing hydroxyl groups with the component (B) organic polyisocyanate is carried out using amounts of said components (A) and (B) such that there are 0.7-1.2 NCO groups per hydroxyl group.

13. Process for the manufacture of coatings from copolymers which contain hydroxyl groups and are reaction products of mixtures of styrene, methyl methacrylate, hydroxyethyl methacrylate, acrylic acid and glycidyl esters of α-alkylalkanemonocarboxylic acids and/or α,α-dialkylalkanemonocarboxylic acids, and from organic polyisocyanates in solvents which have no active hydrogen atoms, characterised in that a mixture which consists of A. a copolymer which contains hydroxyl groups and consists of
 (a) 20-25.9% by weight of styrene,
 (b) 20-24% by weight of methyl methacrylate,
 (c) 18-24% by weight of hydroxyethyl methacrylate,
 (d and e) 37.5-46% by weight of a reaction product of the formula

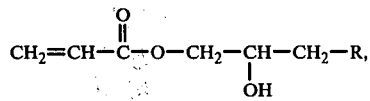

wherein R is the radical of α-alkylalkanemonocarboxylic acids and/or α,α-dialkylalkanemonocarboxylic acids and the radical has the empirical formula $C_{10}H_{19}O_2$, and in which the incorporated components (a), (b), (c), (d), the acrylic acid, and (e), the glycidyl ester used to prepare the above reaction product (d and e) add up to 100% by weight, dissolved in solvents which do not contain active hydrogen atoms, and (B) an organic polyisocyanate, which is reacted with the copolymer (A), the amounts of the copolymer (A) and the polyisocyanate (B) in the coating mixture adding up to 100 percent by weight, and this mixture of copolymer (A) and polyisocyanate (B) is shaped or applied to suitable substrates and the solvent is then removed, in order to obtain the finished coating.

* * * * *

UNITED STATES PATENT AND TRADEMARK OFFICE
CERTIFICATE OF CORRECTION

PATENT NO. : 4,145,513

DATED : March 20, 1979

INVENTOR(S) : Dalibor

It is certified that error appears in the above-identified patent and that said Letters Patent are hereby corrected as shown below:

Col. 2, line 9; "0.02-5" should read -- 0.2-5 --
Col. 3, line 40; "α-ethylalkanoemonocarboxylic" should read
   -- α-ethylalkanemonocarboxylic --
Col. 3, line 48; "doxide" should read -- dioxide --
Col. 5, line 13; "4-8hours" should read -- 4-8 hours --
Col. 7, line 3; "dissocyanate" should read -- diisocyanate --
Col. 7, line 12; "-2,7-diisocyanate" should read -- -2,7-diisocyanate, --
Col. 7, line 13; "anthraquinone2,6diisocyanate" should read
   -- anthraquinone-2,6-diisocyanate --
Col. 7, line 51; "ssuch" should read -- such --
Col. 8, line 24; "coatingsd" should read -- coatings --
Col. 8, line 46; "-dialkyalkanemonocarboxylic"should read
   -- -dialkylalkanemonocarboxylic --
Col. 8, line 50; "atoms and" should read -- atoms, and --
Col. 10, line 1; "and mol" should read -- and 1 mol --
Col. 11, line 55; "Frence" should read -- French --
Col. 12, line 18; "disslved" should read -- dissolved --
Col. 14, first table, second line across from component E, under Examples;
   "alkylakanemonocar-" should read -- alkylalkanemonocar- --
Col. 14, first table, third line across from component E, under Examples;
   "acid" should read -- acids --

UNITED STATES PATENT AND TRADEMARK OFFICE
CERTIFICATE OF CORRECTION

PATENT NO. : 4,145,513

DATED : March 20, 1979

INVENTOR(S) : Dalibor

It is certified that error appears in the above-identified patent and that said Letters Patent are hereby corrected as shown below:

Col. 16, lines 36 & 37 ; "afor-mentioned" should read -- aforementioned --

Col. 16, lines 47 & 48; "α-alkylalanemonocarboxylic" should read -- α-alkylalkanemonocarboxylic --

Col. 18, line 13; "$C_{10}H_{10}O_2$" should read -- $C_{10}H_{19}O_2$ --

Col. 18, line 23; "ane" should read -- end --

Signed and Sealed this

Third Day of July 1979

[SEAL]

Attest:

Attesting Officer

LUTRELLE F. PARKER

Acting Commissioner of Patents and Trademarks